US012668036B2

(12) United States Patent
Rondin et al.

(10) Patent No.: US 12,668,036 B2
(45) Date of Patent: Jun. 30, 2026

(54) COMPOSITE THERMOPLASTIC MATERIAL FOR COMPOSITE TUBULAR STRUCTURES

(71) Applicant: Arkema France, Colombes (FR)

(72) Inventors: Jerome Rondin, Serquigny (FR);
Cyrille Mathieu, Pierre-Benite Cedex (FR)

(73) Assignee: ARKEMA FRANCE, Puteaux (FR)

( * ) Notice: Subject to any disclaimer, the term of this patent is extended or adjusted under 35 U.S.C. 154(b) by 258 days.

(21) Appl. No.: 18/270,000

(22) PCT Filed: Jan. 6, 2022

(86) PCT No.: PCT/FR2022/050027
§ 371 (c)(1),
(2) Date: Jun. 28, 2023

(87) PCT Pub. No.: WO2022/152995
PCT Pub. Date: Jul. 21, 2022

(65) Prior Publication Data
US 2024/0066827 A1    Feb. 29, 2024

(30) Foreign Application Priority Data
Jan. 12, 2021    (FR) ..................................... 21.00233

(51) Int. Cl.
*B32B 1/08*        (2006.01)
*B32B 27/08*       (2006.01)
(Continued)

(52) U.S. Cl.
CPC ................ *B32B 1/08* (2013.01); *B32B 27/08* (2013.01); *B32B 27/20* (2013.01); *B32B 27/304* (2013.01);
(Continued)

(58) Field of Classification Search
CPC ........... B32B 1/08; B32B 27/08; B32B 27/20; B32B 27/304; B32B 2250/02;
(Continued)

(56) References Cited

U.S. PATENT DOCUMENTS 4,606,378 A     8/1986  Meyer
6,110,550 A     8/2000  Jarrin et al.
(Continued)

FOREIGN PATENT DOCUMENTS

CN        106189002 A     12/2016
CN        108342036 A      7/2018

OTHER PUBLICATIONS

Qualicer 14 "Relationship Between the Specific Surface Area Parameters Determined Using Different Analytical Techniques"; M. P. Gomez-Tena et al.—pp. 1-5.

*Primary Examiner* — Matthew D Matzek
(74) *Attorney, Agent, or Firm* — Boone IP Law

(57)               ABSTRACT

The invention relates to a composition comprising at least one fluoropolymer and at least one high-density filler. The invention also relates to a thermoplastic composite tubular structure which comprises at least one external layer consisting of said composition. The invention also relates to the process for the manufacture of said composition, and also to its applications as external layer for weighing down thermoplastic composite pipes transporting fluids in the context of oil and gas exploration and exploitation.

19 Claims, 1 Drawing Sheet

(51) Int. Cl.
  *B32B 27/20* (2006.01)
  *B32B 27/30* (2006.01)
(52) U.S. Cl.
  CPC ....... *B32B 2250/02* (2013.01); *B32B 2255/10* (2013.01); *B32B 2260/021* (2013.01); *B32B 2260/046* (2013.01); *B32B 2264/102* (2013.01); *B32B 2264/303* (2020.08); *B32B 2307/72* (2013.01); *B32B 2307/7376* (2023.05); *B32B 2597/00* (2013.01)
(58) Field of Classification Search
  CPC .......... B32B 2255/10; B32B 2260/021; B32B 2260/046; B32B 2264/102; B32B 2264/303; B32B 2307/72; B32B 2307/7376; B32B 2597/00; B32B 2250/03; B32B 2262/0269; B32B 2262/101; B32B 2262/106; B32B 2264/12; B32B 2270/00; C08F 214/22; C08K 2003/2275; C08K 3/22; C08L 2205/025; C08L 27/16
  USPC ....................................................... 428/36.1
  See application file for complete search history.

(56) References Cited

U.S. PATENT DOCUMENTS

| | | | |
|---|---|---|---|
| 6,187,885 B1 | 2/2001 | Barber | |
| 11,635,157 B2 | 4/2023 | Xu et al. | |
| 2015/0041118 A1 | 2/2015 | Chalumeau | |
| 2016/0123504 A1* | 5/2016 | Pasquier | C08K 3/22 252/389.52 |
| 2020/0408337 A1 | 12/2020 | Xu et al. | |
| 2022/0010117 A1* | 1/2022 | Sanguineti | C08L 27/16 |

* cited by examiner

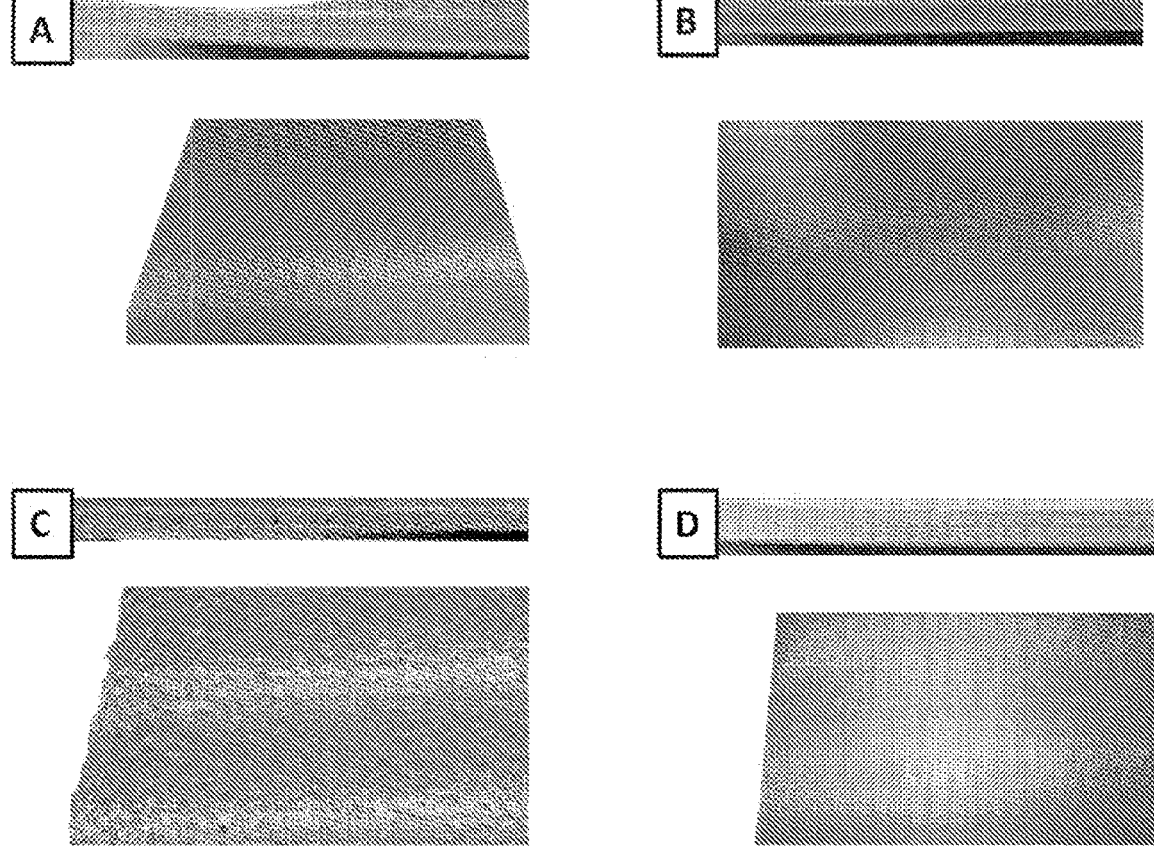

COMPOSITE THERMOPLASTIC MATERIAL FOR COMPOSITE TUBULAR STRUCTURES

This application is a national stage application under 35 U.S.C. § 371 of PCT Application PCT/FR2022/050027, filed 6 Jan. 2022; which claims benefit to French National Patent Application Number 2100233, filed 12 Jan. 2021; said applications incorporated herein by reference.

FIELD OF THE INVENTION

The present invention relates to the field of the transportation of fluids for underwater or "offshore" oil exploitation. More particularly, the invention relates to a composition comprising at least one fluoropolymer and at least one high-density filler. The invention also relates to a thermoplastic composite tubular structure which comprises at least one external layer consisting of said composition. The invention also relates to the process for the manufacture of said composition, and also to its applications as external layer for weighing down thermoplastic composite pipes transporting fluids in the context of oil and gas exploration and exploitation.

TECHNICAL BACKGROUND

In order to exploit and transport oil off-shore, the oil and gas industry distinguishes mainly two types of pipes:
  a first type for transporting the oil or gas from the level of the marine soil as far as the central well: these are the tubes known as flow lines, and
  a second type for raising the oil or gas from the central well at the bottom of the sea as far as the floating platform on the surface: these are the risers.
The technologies used for the manufacture of these pipes are either rigid metal pipes or "flexible" pipes. For pipelines intended for the transportation of fluids and gases, steel has long been the material of choice, especially at sea. The metal pipe, which is less expensive, is however more difficult to install and sensitive to corrosion and fatigue, while the flexible pipe, composed of several layers (both polymeric and metallic), is simpler to install but more expensive in raw material cost.

In both cases, an issue related to the weight of these structures emerges because, with increasingly deep fields, the increasingly long pipes come to the limit of supporting their own weight: it is thus necessary to lighten these structures.

To address this issue of lightening, but also of cost and of ease of installation, a new metal-free composite technology is emerging: thermoplastic composite tubular structures or "Thermoplastic Composite Pipes" (TCP).

Thermoplastic composite pipes use thermoplastic composite materials instead of steel to provide the pipelines with strength and rigidity. These structures are composed of an internal polymeric coating targeted at providing watertightness and chemical resistance, of a layer made of polymer reinforced with continuous fibers (glass, aramid, carbon, and the like) for mechanical strength, and also of a protective external sheath.

TCP offers a combination of high resistance, of flexibility and of ease of finishing, conferring on it the best qualities of conventional metal pipes (strong but rigid) and of flexible pipes manufactured from nonbonded layers of helically applied metal wires and from extruded thermoplastics (flexible but heavy, and very expensive to finish on site).

However, in some cases, these structures are even too light to be stable under water: they thus have to be weighed down.

Steel pipes comprising a layer acting as ballast, it being possible for said layer to be located inside or outside the pipe, are known.

The document FR 3 007 033 describes a composite material composition for the neutralization of at least one acid compound from carbon dioxide $CO_2$ and hydrogen sulfide $H_2S$, said composition comprising a mixture of a polymer material with a predetermined amount of products which are chemically active with said acid compound so as to irreversibly neutralize the corrosive effects of said acid compounds. However, the fraction by weight of said chemically active products is of between 4% and 40% because, as indicated on page 14, 1. 6-9, filler contents of greater than 40% weaken the mechanical properties of the composite materials.

The document U.S. Pat. No. 4,606,378 describes a subsea pipe comprising a steel pipe provided with a continuous weight coating in the form of a relatively thick layer of a composite material consisting of granules of a relatively heavy material embedded in a plastic matrix, said composite material being covered with a plastic pipe. Said plastic matrix consists of a thermosetting resin, such as acrylic resin, polyurethane or epoxy, whereas the heavy material incorporated in the plastic resin consists of a heavy metal ore, for example an iron ore, such as magnetite or hematite, in the form of particles or granules. According to this document, favorable results were obtained by using a composite material consisting of from 85% to 95% by weight of magnetite in a matrix of from 5% to 15% by weight of epoxy resin.

However, this approach targeting steel pipes may not be suitable for thermoplastic composite pipes.

There thus exists a need to develop a new composite material for manufacturing a layer capable of effectively ballasting thermoplastic composite pipes (TCP). It is also necessary for said material to be able to be employed by extrusion, in order to cover a TCP structure. Furthermore, it is necessary for this polymeric sheath to be homogeneous and devoid of surface defects. This layer must also be flexible enough for the TCP to be able to be rolled up, even at low temperatures.

It has now been found that a polymeric sheath containing a thermoplastic polymer and weighting fillers, and covering a thermoplastic composite tubular structure in order to weigh down the entire structure, effectively solves all of these problems.

SUMMARY OF THE INVENTION

The invention relates first to a composite material consisting of a thermoplastic fluoropolymer matrix in which are incorporated particles of at least one inorganic filler compatible with said fluoropolymer, said particles having a density of at least 3 $g/cm^3$, preferably of at least 4 $g/cm^3$, advantageously of at least 5 $g/cm^3$, the content by weight of fillers being greater than 40% and ranging up to 70%, said particles having a size defined by a D50 of less than 20 μm and by a D90 of less than 50 μm.

According to one embodiment, said fluoropolymer is chosen from homopolymers of vinylidene fluoride (PVDF) and copolymers of vinylidene fluoride and of at least one other comonomer, and their mixtures.

According to one embodiment, said fluoropolymer is a mixture of a PVDF homopolymer and of a copolymer of vinylidene difluoride (VDF) and of hexafluoropropylene (HFP).

According to one embodiment, said fluoropolymer is a mixture of two VDF-HFP copolymers having different HFP contents.

According to one embodiment, said filler is chosen from metal oxides, such as iron(II) oxide (FeO), iron(III) oxide ($Fe_2O_3$), iron(II,III) oxide ($Fe_3O_4$ or FeO $Fe_2O_3$), zinc oxide (ZnO), copper(I) oxide ($Cu_2O$), copper(II) oxide (CuO), lead(II) oxide (PbO), nickel(II) oxide (NiO), aluminum(III) oxide ($Al_2O_3$), the mixtures of these oxides and the associated mineral compounds which can contain these metal oxides: magnetite, hematite, cuprite, and the like.

According to one embodiment, said composite material contains from 50% up to 60% by weight of said filler.

The invention also relates to a process for the manufacture of said composite material, said process comprising a stage of mixing the fluoropolymer and the inorganic filler, which are described above, in the molten state. Said process also comprises a stage of extrusion of said composite material in the form of a tube or sheath intended to cover a thermoplastic composite tubular structure in order to weigh it down and to thus make it possible for it to be used in applications of oil and gas exploration and exploitation.

The invention is also targeted at providing thermoplastic composite pipes (TCP) comprising at least one external layer consisting of said composite material.

The present invention makes it possible to overcome the disadvantages of the state of the art. In particular, the invention provides a fluoropolymer-based composite material incorporating high-density fillers, in order to form a composition with a high density, greater than that of the fluoropolymer (by way of example, the density of PVDF is 1.78 $g/cm^3$) and greater than or equal to 2.15 $g/cm^3$, preferably greater than or equal to 2.3 $g/cm^3$, advantageously greater than or equal to 2.5 $g/cm^3$, which makes it possible to manufacture therefrom a layer which, alone or several-fold, will subsequently cover a thermoplastic composite tubular structure (TCP) in order to weigh down the entire structure.

FIGURE

FIG. 1 comprises images representing the external and core appearance of extruded strips of VDF-HFP copolymers containing 50% or 60% by weight of magnetite.

DESCRIPTION OF EMBODIMENTS OF THE INVENTION

The invention is now described in more detail and in a nonlimiting way in the description which follows.

According to a first aspect, the invention relates to a composite material consisting of a thermoplastic fluoropolymer matrix in which are incorporated particles of at least one inorganic filler compatible with said fluoropolymer, said particles having a density of at least 3 $g/cm^3$, preferably of at least 4 $g/cm^3$, advantageously of at least 5 $g/cm^3$, the content by weight of fillers being greater than 40% and ranging up to 70%, said particles having a size defined by a D50 of less than 20 μm and by a D90 of less than 50 μm.

According to various implementations, said composite material comprises the following features, if appropriate combined.

The term "thermoplastic" is understood here to mean a nonelastomeric polymer. An elastomeric polymer is defined as being a polymer which can be drawn, at ambient temperature, to twice its initial length and which, after releasing the stresses, rapidly resumes its initial length, to within about 10%, as indicated by the ASTM in the Special Technical Publication, No. 184.

The fluoropolymer contains, in its chain, at least one monomer chosen from compounds containing a vinyl group capable of opening in order to polymerize and which contains, directly attached to this vinyl group, at least one fluorine atom, a fluoroalkyl group or a fluoroalkoxy group.

According to one embodiment, the fluoropolymer is chosen from homopolymers of vinylidene fluoride (PVDF) and copolymers of vinylidene fluoride and of at least one other comonomer, and their mixtures. According to one embodiment, the comonomer of the VDF is chosen from vinyl fluoride, trifluoroethylene (VF3), chlorotrifluoroethylene (CTPB), 1,2-difluoroethylene, tetrafluoroethylene (TFE,), hexafluoropropylene (HFP), perfluoro(alkyl vinyl) ethers, such as perfluoro(methyl vinyl) ether (PMVE), perfluoro (ethyl vinyl) ether (PEVE) or perfluoro(propyl vinyl) ether (PPVE), perfluoro(1,3-dioxozole), perfluoro(2,2-dimethyl-1,3-dioxole) (PDD), the product of formula $CF_2=CFOCF_2CF(CF_3)OCF_2CF_2X$ in which X is $SO_2F$, $CO_2H$, $CH_2OH$, $CH_2OCN$ or $CH_2OPO_3H$, the product of formula $CF_2=CFOCF_2CF_2SO_2F$; the product of formula $F(CF_2)_nCH_2OCF=CF_2$ in which n is 1, 2, 3, 4 or 5, the product of formula $R_1CH_2OCF=CF_2$ in which $R_1$ is hydrogen or $F(CF_2)z$ and z has the value 1, 2, 3 or 4; the product of formula $R_3OCF=CH_2$ in which $R_3$ is $F(CF_2)$ z and z has the value 1, 2, 3 or 4 or also perfluorobutylethylene (PFBE), fluorinated ethylene propylene (FEP), 3,3,3-trifluoropropene, 2-(trifluoromethyl)-3,3,3-trifluoro-1-propene, 2,3,3,3-tetrafluoropropene or HFO-1234yf, E-1,3,3,3-tetrafluoropropene or HFO-1234zeE, Z-1,3,3,3-tetrafluoropropene or HFO-1234zeZ, 1,1,2,3-tetrafluoropropene or HFO-1234yc, 1,2,3,3-tetrafluoropropene or HFO-1234ye, 1,1,3,3-tetrafluoropropene or HFO-1234zc, chlorotetrafluoropropene or HCFO-1224, chlorotrifluoropropenes (in particular 2-chloro-3,3,3-trifluoropropene), 1-chloro-2-fluoroethylene, trifluoropropenes (in particular 3,3,3-trifluoropropene), pentafluoropropenes (in particular 1,1,3,3,3-pentafluoropropene or 1,2,3,3,3-pentafluoropropene), 1-chloro-2,2-difluoroethylene, 1-bromo-2,2-difluoroethylene and bromotrifluoroethylene. The copolymer can also comprise nonfluorinated monomers, such as ethylene.

According to one embodiment, said comonomer is a fluorinated comonomer chosen from: hexafluoropropylene (HFP), perfluoro(methyl vinyl) ether (PMVE), perfluoro (ethyl vinyl) ether (PEVE), perfluoro(propyl vinyl) ether (PPVE), tetrafluoroethylene (TFE), perfluorobutylethylene (PFBE), chlorotrifluoroethylene (CITE), fluorinated ethylene propylene (FEP) and trifluoroethylene. The copolymer can also be a terpolymer.

According to one embodiment, the comonomer is HFP. Preferably, the copolymer comprises only VDF and HFP. Preferably, these copolymers contain at least 50% by weight of VDF, advantageously at least 75% by weight of VDF and preferably at least 80% by weight of VDF.

According to one embodiment, the VDF-HFP copolymer exhibits a content by weight of HFP of greater than 10%, preferably of greater than 15%. This makes it possible to lower the flexural modulus of the coating, which considerably increases the flexibility properties of the article according to the invention.

According to one embodiment, said VDF-HFP copolymer is a random copolymer. This type of copolymer exhibits the advantage of exhibiting a uniform distribution of the comonomer along the vinylidene fluoride chains.

According to one embodiment, said VDF-HFP copolymer is a "heterogeneous" copolymer which is characterized by a nonhomogeneous distribution of the comonomer along the VDF chains, due to the process of synthesis described by the applicant company for example in the document U.S. Pat. No. 6,187,885. A heterogeneous copolymer possesses two (or more) distinct phases, with a phase rich in PVDF and a copolymer phase rich in HFP comonomer.

According to one embodiment, the heterogeneous copolymer consists of noncontinuous, discrete and individual copolymer domains of phase rich in comonomer, which are distributed homogeneously in a continuous phase rich in PVDF. The term "a noncontinuous structure" is then used.

According to another embodiment, the heterogeneous copolymer is a copolymer having two (or more) continuous phases which are intimately bonded together and cannot be physically separated. The term "a cocontinuous structure" is then used.

The heterogeneous copolymer can be manufactured by forming an initial polymer which is rich in VDF monomer units, generally greater than 90% by weight of VDF, preferably greater than 95% by weight, and in a preferred embodiment a PVDF homopolymer, and by then adding a comonomer to the reactor at a well-advanced point of the polymerization in order to produce a copolymer. The polymer and the copolymer which are rich in VDF will form distinct phases, which will give an intimate heterogeneous copolymer.

According to one embodiment, said fluoropolymer is chosen from:
i. a PVDF homopolymer;
ii. a mixture of two PVDF homopolymers exhibiting different viscosities, or different molar masses, or different architectures, for example different degrees of branching;
iii. a copolymer comprising vinylidene fluoride (VDF) units and one or more types of units of comonomers compatible with vinylidene fluoride (hereinafter referred to as "VDF copolymer");
iv. a mixture of a PVDF homopolymer and of a VDF copolymer;
v. a mixture of two VDF copolymers.

The fluoropolymers used in the invention can be obtained by known polymerization methods, such as solution, emulsion or suspension polymerization. According to one embodiment, they are prepared by an emulsion polymerization process in the absence of fluorinated surface-active agent.

According to one embodiment, said filler is chosen from metal oxides, such as iron(II) oxide (FeO), iron(III) oxide ($Fe_2O_3$), iron(II,III) oxide ($Fe_3O_4$ or FeO $Fe_2O_3$), zinc oxide (ZnO), copper(I) oxide ($Cu_2O$), copper(II) oxide (CuO), lead(II) oxide (PbO), nickel(II) oxide (NiO), aluminum(III) oxide ($Al_2O_3$), the mixtures of these oxides and the associated mineral compounds which can contain these metal oxides: magnetite, hematite, cuprite, and the like.

All these compounds have a density of at least 3 g/cm³, preferably of at least 4 g/cm³, advantageously of greater than 5 g/cm³, measured according to the standard ASTM D792.

According to one embodiment, the content by weight of fillers varies from 50% up to 60%.

According to one embodiment, the filler particles have a size defined by a D50 of less than 10 μm and by a D90 of less than 15 μm.

The inorganic fillers incorporated in the composite material according to the invention must be thermally stable up to 300° C. This thermal stability is measured by thermogravimetric analysis (TGA) under a flow of air or nitrogen. These fillers must be compatible with the fluoropolymer matrix. The term "compatible" is understood here to mean the ability of these inorganic fillers not to cause degradation of said matrix, in particular by means of a dehydrofluorination reaction.

Not all inorganic fillers can be incorporated directly in a fluorinated matrix. For example, some fillers, such as titanium dioxide, can catalyze a dehydrofluorination reaction of the fluorinated matrix, resulting in a deterioration in the mechanical properties (chain scission) and release of HF. To confirm this, any new filler is thus tested according to a security protocol:
a) melt mixing of fluoropolymer and filler for 10 min at 230° C.,
b) measuring loss of weight by thermogravimetric analysis (isothermal conditions for 1 hour at 250° C.).

If no abnormal sign (fumes, bubbles) is observed on conclusion of stage 1, and no abnormal loss of weight is detected by thermogravimetric analysis on conclusion of this protocol (a loss of weight of less than 0.5% is considered acceptable), then it is considered that the filler is compatible with the fluorinated matrix.

According to one embodiment, the metal oxide is magnetite ($Fe_3O_4$), which exhibits a density of 5.2 g/cm³ at 20° C.

The composite material obtained has a density of greater than 2.15 g/cm³, preferably of greater than or equal to 2.3 g/cm³, advantageously of greater than or equal to 2.5 g/cm³.

In addition, the composite material is nonporous, that is to say that it has no porosity visible by means of an optical microscope.

Advantageously, the composite material according to the invention has a ductile behavior even at −20° C., its yield point strain being greater than 5%, measured according to the standard ASTM D638.

The invention also relates to a process for the manufacture of said composite material, said process comprising a stage of mixing the fluoropolymer and the inorganic filler, which are described above, in the molten state. According to one embodiment, this stage is carried out by means of corotating twin-screw extruders, co-kneaders or internal mixers.

This process makes possible a homogeneous distribution of the fillers in the fluoropolymer matrix. It has been discovered that, above a particle size value, the distribution of the filler in the polymer matrix is no longer sufficiently homogeneous to ensure the absence of cavities and of surface defects. Consequently, according to the invention, use is preferably made of fillers in the form of particles, the size distribution of which is defined by the D50 and D90 diameters.

The D50 is the median diameter by volume, which corresponds to the value of the particle size which divides the population of particles which are examined exactly into two. The D90 is the median diameter by volume for which 90% of the population analyzed is less than this value. These diameters are measured according to the standard ISO 9276. In the present invention, a Malvern Insitec particle sizer is used and the measurement is carried out by the dry route by laser diffraction on the filler.

The D50 is less than 20 μm, preferably less than 10 μm, while the D90 is less than 50 μm, preferably less than 15 μm.

The D50 is greater than or equal to 1 μm and the D90 is greater than or equal to 5 μm.

These composite materials can then be used to cover a TCP structure by extrusion in order to weigh it down, in the context of oil and gas exploration and exploitation.

The weighted polymeric sheath is for its part obtained by extrusion of said composite material in the form of a pipe or sheath. This sheath is used to cover a TCP structure transporting fluids in the context of oil and gas exploration and exploitation, while retaining the key properties of the fluoropolymer, such as the temperature stability or the chemical resistance.

The composite material according to the invention is flexible enough for the TCP to be able to be rolled up, even at low temperatures. The use of a copolymer or of a mixture of copolymers based on VDF as matrix makes it possible to obtain a material which is more flexible and ductile at low temperatures.

The invention also relates to a thermoplastic composite tubular structure comprising:

an internal polymer layer,
a laminate made of polymer reinforced with continuous fibers which are chosen from glass, aramid and carbon fibers,
an external protective coating, the whole being surrounded by at least one external polymer layer produced from the composite material described above.

Advantageously, said at least one external layer exhibits a thickness of at least 5 mm, preferentially of at least 10 mm, and a density of greater than or equal to 2.15 g/cm$^3$, preferably of greater than or equal to 2.3 g/cm$^3$, advantageously of greater than or equal to 2.5 g/cm$^3$.

This sheath covers a thermoplastic composite tubular structure in order to weigh it down and to thus make it possible for it to be used in oil and gas exploration and exploitation applications.

EXAMPLES

The following examples illustrate the invention without limiting it.

Materials:

A comparative study was carried out in order to study the influence of different fluoropolymers:

PVDF-1: VDF-10% by weight of HFP copolymer exhibiting a melt-mass flow index (MFR) of 4 at 230° C. under a weight of 12.5 kg, and a melt viscosity (230° C., 100 s$^{-1}$) of 2350 Pa·s, PVDF-2: VDF-10% by weight of HFP copolymer exhibiting a melt-mass flow index (MFR) of 8 at 230° C. under a weight of 3.8 kg, and a melt viscosity (230° C., 100 s$^{-1}$) of 1000 Pa·s, PVDF-3: VDF-18% by weight of HFP copolymer exhibiting a melt-mass flow index (MFR) of 13 at 230° C. under a weight of 3.8 kg, and a melt viscosity (230° C., 100 s$^{-1}$) of 800 Pa·s.

The melt flow index was measured by means of a plastometer at a temperature of 230° C. according to the standard ISO 1133-1.

The melt viscosity was measured by means of a rheometer equipped with a capillary die at a temperature of 230° C. according to the standard ISO 11443.

Two grades of magnetite with different particle size distributions were evaluated at different contents (50% and 60% by weight) and melt blended with the fluoropolymers:

Magnetite 1: D50=16 μm and D90=50 μm
Magnetite 2: D50=7 μm and D90=13 μm

These two grades of magnetite are supplied by LKAB Minerals.

Production of the PVDF+Magnetite Compositions:

The PVDF+magnetite compositions are produced by melt blending on a Buss® co-kneader (diameter of 46 mm, L/D ratio of 15, flow rate of 20 kg/h, temperature of 220° C.). The compositions thus produced are subsequently extruded in the form of a strip with a thickness of 4 mm using a single-screw extruder (diameter of 30 mm, L/D ratio of 25, flow rate of 20 kg/h, temperature of 220° C.) equipped with a flat die having a width of 150 mm Measurement of the Density:

The measurements of density are carried out on granules according to the standard ASTM D792 by the vertical thrust method.

Tensile Mechanical Properties

The mechanical properties are obtained according to the following conditions:

Test specimens cut from the extruded strips according to the standard ASTM D638 Type 4
Dynamometer MTS 810 #1
Strain rate: 50 mm/min
Measurement of the strain by mechanical extensometer 0-100%
Load cell: 25 kN
No prior conditioning of the test specimens
Test temperature: −20° C.

Measurement of the Thermal Conductivity:

The measurement of the thermal conductivity is carried out using a heat flow meter (FOX 50, TA Instruments) according to the guarded heat flow meter (HFM) method described in the standard ASTM E1530.

Example 1: Homogeneity of Dispersion of the Magnetite Filler and Appearance of Pvdf+Magnetite Compositions Extruded in the Form of a Strip The attached FIG. 1 illustrates the effect of the particle size distribution of magnetite in a PVDF-3 matrix on the external and core appearance of extruded strips with a thickness of 4 mm Composition A: PVDF-3+50 wt % magnetite 1, p=2.5 g/cm$^3$
Composition B: PVDF-3+50 wt % magnetite 2, p=2.53 g/cm$^3$
Composition C: PVDF-3+60 wt % magnetite 1, p=2.75 g/cm$^3$
Composition D: PVDF-3+60 wt % magnetite 2, p=2.8 g/cm$^3$ (where "p" is the density).

The reduction in the size of the magnetite particles considerably improves the dispersion of the filler in the PVDF-3, which has a direct impact on the quality of extrusion of the composition, namely an absence of visible porosity at the core of the material and a smoother external appearance obtained for the compositions B and D comprising magnetite 2 (D90=13 ittm). The incorporation of this magnetite 2 up to 60% by weight (composition D) also makes it possible to achieve a density of 2.8 g/cm$^3$, with no visible defects.

On the other hand, the composition C comprising 60% by weight of magnetite 1 (D90=50 μm) exhibits porosities visible at the core of the material and also a rough external appearance with numerous surface defects.

Example 2: Mechanical Properties of PVDF+Magnetite Compositions

The results obtained are presented in table 1. The percentages indicated are by weight and "s" represents the standard deviation of measurements which are obtained on 3 samples tested. The composition E (PVDF-2+50 wt % magnetite 2) does not make it possible to obtain a minimum yield point strain of 5% at −20° C.

For the compositions A to D containing PVDF-3, the following results are observed:

At 50% by weight (compositions A and B), the two qualities of magnetite make it possible to obtain a density of 2.5 g/cm$^3$. However, the choice of magnetite 2 clearly improves the properties of yield point strain and strain at break, measured at −20° C.

For the composition D comprising 60% by weight of magnetite 2, a density of 2.8 g/cm$^3$ is achieved, while retaining a yield point strain at −20° C. of greater than 5% at −20° C., and also a good extrusion quality visible in FIG. 1.

Conversely, for the composition C comprising 60% by weight of magnetite 1, necking and premature breaking of the samples are observed during the tensile test at −20° C., which reflects a nonuniformity of dispersion of the material. This nonuniformity of dispersion is also visible in FIG. 1.

TABLE 1

| Composition | A | B | C | D | E | F |
|---|---|---|---|---|---|---|
| PVDF-1 | | | | | | 50 |
| PVDF-2 | | | | | 50 | |
| PVDF-3 | 50 | 50 | 40 | 40 | | |
| Magnetite 1 | 50 | | 60 | | | |
| Magnetite 2 | | 50 | | 60 | 50 | 50 |
| Density (g/cm$^3$) | 2.5 | 2.53 | 2.75 | 2.8 | 2.53 | 2.55 |
| | (s = 0.01) | (s = 0.01) | (s = 0.01) | (s = 0.02) | (s = 0.01) | (s = 0.01) |
| TENSILE TESTING −20° C. | | | | | | |
| Yield point stress (MPa) | 34.6 | 35.4 | Necking | 39.4 | 45.1 | 48.7 |
| | (s = 1.5) | (s = 2.9) | and | (s = 1.3) | (s = 1.3) | (s = 2) |
| Yield point strain (%) | 5.8 | 7.7 | premature | 5.2 | 3.6 | 7 |
| | (s = 0.3) | (s = 0.9) | breaking | (s = 0.2) | (s = 0.3) | (s = 0.3) |
| Breaking stress (MPa) | 32.3 | 30.7 | of the | 38.7 | 42.4 | 47.2 |
| | (s = 0.6) | (s = 4.1) | tensile | (s = 1.5) | (s = 0.9) | (s = 2.2) |
| Strain at break (%) | 8.1 | 15.8 | test | 7.3 | 5 | 11.5 |
| | (s = 1.6) | (s = 4.2) | dumbbells | (s = 0.7) | (s = 0.1) | (s = 1.1) |

The composition F comprising a PVDF-1, which is more viscous than PVDF-3, and 50% by weight of magnetite 2 also makes it possible to achieve a density of 2.5 g/cm$^3$, and also a yield point strain at −20° C. of greater than 5%.

Example 3: Measurements of the Thermal Conductivity of PVDF+Magnetite Compositions A study of the thermal conductivity of the compositions A, B and D also confirmed the importance of the particle size distribution of the magnetite filler. The results are presented in table 2. For one and the same content of magnetite (50% by weight), an increase in the thermal conductivity is observed with the magnetite 2, which can be linked to a better dispersion of the magnetite 2 in the volume of the material, and thus to its smaller particle size distribution.

TABLE 2

| Material | Thermal conductivity (W/m · K) |
|---|---|
| Composition A = PVDF-3 + 50 wt % magnetite 1 (D90 = 50 μm) | 0.26 |
| Composition B = PVDF-3 + 50 wt % magnetite 2 (D90 = 13 μm) | 0.30 |
| Composition D = PVDF-3 + 60 wt % magnetite 2 (D90 = 13 μm) | 0.36 |

The invention claimed is:

1. A composite material consisting of a thermoplastic fluoropolymer matrix, said thermoplastic fluoropolymer matrix containing fluoropolymer, in which are incorporated particles of at least one inorganic filler compatible with said fluoropolymer, said particles having a density of at least 3 g/cm$^3$, the content by weight of fillers being from 50% and ranging up to 70%, said particles having a size defined by a D50 of less than 20 μm and of greater than or equal to 1 μm and a D90 of less than 50 μm and greater than or equal to 5 μm.

2. The composite material as claimed in claim 1, in which said fluoropolymer is selected from the group consisting of homopolymers of vinylidene fluoride (PVDF), copolymers comprising vinylidene fluoride (VDF) units and one or more types of units of comonomers compatible with vinylidene fluoride, and their mixtures.

3. The composite material as claimed in claim 1, in which said fluoropolymer is selected from the group consisting of:
   a PVDF homopolymer;
   a mixture of two PVDF homopolymers exhibiting at least one of different viscosities, or different molar masses, or different architectures;
   a copolymer comprising VDF units and one or more types of units of comonomers;
   a mixture of a PVDF homopolymer and of a VDF copolymer;
   a mixture of two VDF copolymers.

4. The composite material as claimed in claim 2, in which said comonomer compatible with VDF is selected from the group consisting of: hexafluoropropylene, perfluoro(methyl vinyl) ether, perfluoro(ethyl vinyl) ether, perfluoro(propyl vinyl) ether, tetrafluoroethylene, perfluorobutylethylene, chlorotrifluoroethylene, fluorinated ethylene propylene and trifluoroethylene.

5. The composite material as claimed in claim 2, in which said comonomer is hexafluoropropylene, the copolymer having a content by weight of HFP of greater than 10%.

6. The composite material as claimed in claim 1, in which said filler is selected from the group consisting of: iron (II) oxide, iron (III) oxide, iron (II, III) oxide, zinc oxide, copper (I) oxide, copper (II) oxide, lead (II) oxide, nickel (II) oxide, aluminum (III) oxide, the mixtures of these oxides and the associated mineral compounds which can contain these metal oxides.

7. The composite material as claimed in claim 1, wherein said composite material has a density of greater than or equal to 2.15 g/cm$^3$.

8. The composite material as claimed in claim 1, the particles of the filler having a size defined by a D50 of less than 10 μm and a D90 of less than 15 μm.

9. The composite material as claimed in claim 1, in which said filler comprises magnetite.

10. The composite material as claimed in claim 1, wherein said material is nonporous.

11. A process for the manufacture of the composite material as claimed in claim 1, said process comprising a step of heating the fluoropolymer to a molten state and mixing the fluoropolymer and the inorganic filler.

12

12. The process as claimed in claim 11, further comprising a step of extruding said composite material into a form of a pipe or sheath.

13. A thermoplastic composite tubular structure comprising:

an internal polymer layer, a laminate made of polymer reinforced with continuous fibers, an external protective coating, and at least one external layer comprising the composite material as claimed in claim 1.

14. The thermoplastic composite tubular structure as claimed in claim 13, in which said at least one external layer exhibits a thickness of at least 5 mm, and a density of greater than or equal to 2.15 g/cm$^3$.

15. The composite material as claimed in claim 1, in which said filler comprises a metal oxide.

16. The composite material as claimed in claim 1, wherein said particles have a density of at least 4 g/cm$^3$.

17. The composite material as claimed in claim 1, wherein said particles have a density of at least 5 g/cm$^3$.

18. The composite material as claimed in claim 1, wherein said composite material has a density of greater than or equal to 2.3 g/cm$^3$.

19. The composite material as claimed in claim 1, wherein said composite material has a density of greater than or equal to 2.5 g/cm$^3$.

* * * * *